US008305975B2

(12) United States Patent
Tortora (10) Patent No.: US 8,305,975 B2
(45) Date of Patent: Nov. 6, 2012

(54) RADIO RESOURCE ALLOCATION INFORMATION EXCHANGE BETWEEN BASE STATIONS

(75) Inventor: Daniele Tortora, Sesto s. Giovanni (IT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 378 days.

(21) Appl. No.: 12/450,035

(22) PCT Filed: Mar. 6, 2008

(86) PCT No.: PCT/EP2008/052735
§ 371 (c)(1),
(2), (4) Date: Sep. 9, 2009

(87) PCT Pub. No.: WO2008/110500
PCT Pub. Date: Sep. 18, 2008

(65) Prior Publication Data
US 2010/0080180 A1    Apr. 1, 2010

(30) Foreign Application Priority Data

Mar. 9, 2007    (EP) .................................... 07425139

(51) Int. Cl.
*H04W 4/00*    (2009.01)

(52) U.S. Cl. ....................................... 370/329; 455/450

(58) Field of Classification Search ................... 370/229, 370/230, 230.1, 236, 259, 310, 310.2, 315, 370/329, 341–350, 431; 455/450, 451, 452.2, 455/453, 522
See application file for complete search history.

(56) References Cited

U.S. PATENT DOCUMENTS

| 7,924,794 | B2 | 4/2011 | Ballarini et al. |
| 2002/0082021 | A1* | 6/2002 | Chen et al. ..................... 455/450 |

(Continued)

FOREIGN PATENT DOCUMENTS

EP    1 603 296 A    12/2005

(Continued)

OTHER PUBLICATIONS

"Management of radio resources assigned to neighboring BSs", pp. 1-13, IEEE 802.16 Broadband Wireless Access Working Group,Sep. 2006.*

(Continued)

*Primary Examiner* — Habte Mered
(74) *Attorney, Agent, or Firm* — Staas & Halsey LLP (57) ABSTRACT

A method for improving distributed resource allocation in OFDMA based wireless communication networks such as WiMAX IEEE 802.16 for either fixed or mobile subscriber stations SSs is executed by neighbor Base Stations BSs serving the SSs. Each BS controls the allocation of respective permutation zones and radio resources encompassing different radio subchannels within each permutation zone. In this task the BS avails of RRM primitives and instances of a NCMS functionality promoting direct BS-to-BS communication, which can be exploited in a distributed RRM profile. A BS playing the role of RRC sends to Neighbor BSs a unique RRM Request for receiving event-driven Spare Capacity Reports. Among driving events, "Change of Radio Resources Allocation" is included. Neighbor BSs, at every allocation change is detected, send to the requester BS a Spare Capacity Report including a Bitmap indicating subchannels used for transmission in each Permutation Zone. In order to eliminate Co-Channel Interference CCI, the requester BS avoids using same subchannels already indicated in the received Bitmap.

14 Claims, 6 Drawing Sheets

U.S. PATENT DOCUMENTS

2005/0111429 A1* 5/2005 Kim et al. .................. 370/344
2007/0189214 A1* 8/2007 Hyon et al. .................. 370/329
2008/0112308 A1* 5/2008 Cleveland .................. 370/204

FOREIGN PATENT DOCUMENTS

EP 1885142 A1 2/2008
WO 2005/099174 A 10/2005

OTHER PUBLICATIONS

WiMAX Forum:"Stage 3:Detailed Protocols and Procedures" WIMAX End-to-end Network System Architecture, pp. 156-162.*

"Part 16:Air Interface for Fixed and Mobile Broadband Wireless Access Systems, Amendments: Management Plane Procedures and Services", IEEE P802.16g/D8, Feb. 2007).*

IEEE 802 16 Broadband Wireless Access Working Group: "Management of radio resources assigned to neighboring BSs" IEEE C802.16G-06/052R1, (Sep. 26, 2006), XP002418167 the whole document.

WIMAX Forum: "Stage 3: Detailed Protocols and Procedures" WIMAX End-to-end Network Systems Architecture, (Aug. 8, 2006), pp. 156-162, XP002418166 section 5.9.5.1.

IEEE Computer Society and IEEE Microwave Theory and Techniques Society, "IEEE Standard for Local and Metropolitan Area Networks Part 16: Air Interface for Fixed Broadband Wireless Access Systems", IEEE Std. 802.16-2004 (Revision of IEEE Std 802.16-2001), Oct. 1, 2004.

IEEE Computer Society and IEEE Microwave Theory and Techniques Society, "IEEE Standard for Local and Metropolitan Area Networks Part 16: Air Interface for Fixed Broadband Wireless Access Systems" Amendment 2: Physical and Medium Access Control Layers for Combined Fixed and Mobile Operation in Licensed Bands and Corrigendum 1, Feb. 28, 2006.

IEEE Computer Society and IEEE Microwave Theory and Techniques Society, "Draft IEEE Standard for Local and Metropolitan Area Networks Part 16: Air Interface for Fixed and Mobile Brodband Wireless Access Systems—Management Plane Procedures and Services", IEEE P802.16g/D7, Jan. 2007.

WIMAX Forum, "WIMAX End-to-end Network Systems Architecture (Stage 2: Architecture Tenets, Reference Model and Reference Points)", Revision 1.0.0: Mar. 9, 2007, draft.

WIMAX Forum, "WIMAX End-to-end Network Systems Architecture (Stage 3: Detailed Protocols and Procedures)", Revision 1.0.0: Mar. 9, 2007, draft.

Proposed change to IEEE 802.16g/D7, Feder et al., "DL and UL Radio Resource Reporting in the DCD and UCD Message", IEEE C802.16g-07/031r2, Feb. 18, 2007.

* cited by examiner

RADIO RESOURCE ALLOCATION INFORMATION EXCHANGE BETWEEN BASE STATIONS

CROSS REFERENCE TO RELATED APPLICATIONS

This application is based on and hereby claims priority to PCT Application No. PCT/EP2008/052735 filed on Mar. 6, 2008 and European Application No. EP07425139 filed on Mar. 9, 2007, the contents of which are hereby incorporated by reference.

BACKGROUND OF THE INVENTION

The present invention relates to communication networks.

It is proposed to improve distributed resource allocation in Orthogonal Frequency Division Multiple Access (OFDMA) wireless communication networks.

The invention is developed with specific attention paid to its possible use in Mobile Wireless Broadband Access networks conforming to IEEE std 802.16-2004 as amended by IEEE 802.16e-2005 and IEEE 802.16g. The current reference texts for the standards mentioned in the foregoing are the following:

IEEE Computer Society and IEEE Microwave Theory and Techniques Society, "IEEE Standard for Local and Metropolitan Area Networks Part 16: Air Interface for Fixed Broadband Wireless Access Systems", IEEE Std 802.16-2004 (Revision of IEEE Std 802.16-2001), 1 Oct. 2004;

IEEE Computer Society and IEEE Microwave Theory and Techniques Society, "IEEE Standard for Local and Metropolitan Area Networks Part 16: Air Interface for Fixed Broadband Wireless Access Systems" Amendment 2: Physical and Medium Access Control Layers for Combined Fixed and Mobile Operation in Licensed Bands and Corrigendum 1, 28 Feb. 2006; and IEEE Computer Society and IEEE Microwave Theory and Techniques Society, "Draft IEEE Standard for Local and Metropolitan Area Networks Part 16: Air Interface for Fixed and Mobile Broadband Wireless Access Systems—Management Plane Procedures and Services", IEEE P802.16g/D7, January 2007.

Further exemplary of networks are Mobile WiMAX networks, based on the IEEE 802.16 specifications.

The current reference texts for the Mobile WiMAX networks are the following:

WiMAX Forum, "WiMAX End-to-End Network Systems Architecture (Stage 2: Architecture Tenets, Reference Model and Reference Points)", Revision 1.0.0: 2007-03-09, draft;

WiMAX Forum, "WiMAX End-to-End Network Systems Architecture (Stage 3: Detailed Protocols and Procedures)", Revision 1.0.0: 2007-03-09, draft.

WiMAX Forum, based on IEEE 802.16 specifications, assign to Radio Resource Management (RRM) the tasks of measurement, exchange, and control of radio resource-related indicators (e.g., current subchannel allocations to service flows) in the wireless network. RRM related signalling is realized by two functional entities within RRM: the Radio Resource Control (RRC) functional entity and Radio Resource Agent (RRA) functional entity.

As expressly indicated by the WiMAX Stage 2 specification, the control function primarily refers to decisions made by a measuring station or remote entity to adjust (i.e., allocate, reallocate or de-allocate) radio resources based on the reported measurements and other information, or by using proprietary algorithms, and communicating such adjustments to network entities using standardized primitives. Such control may be local and remote from the measuring station.

WiMAX forum architecture specifications define the network elements where Access Service Network (ASN) functions are located. In particular, Section 14.2.6 "Radio Resource Management" of IEEE 802.16g/D7 specification describes the set of primitives for supporting RRM procedures between a Base Station (BS) and Network Control and Management System (NCMS). Since NCMS, or part of it, can be located in a BS, RRM primitives also permit direct BS-to-BS communication, which can be exploited in case of distributed RRM profile. A RRM network profile is considered hereafter. In this network profile radio resources (e.g. Permutation Zones, available subchannels) are not allocated by a central controller which coordinates several BSs but by individual BS RRM functions. At present time, IEEE 802.16g specification allows BSs to exchange RRM related information by RRM Request and Response primitives: C-RRM-REQ and C-RRM_RSP. Any time an updated information is needed, Radio Resource Control (RRC) entity in the BS can send to all neighbor BSs the message C-RRM-REQ (Action_Type=Spare Capacity Report). Neighbor BS replies with C-RRM-RSP (Action_Type=Spare Capacity Report), providing details concerning the allocated Permutation Zones.

Since allocation of Permutation Zones is controlled by local BS RRM in a distributed RRM profile, very frequent message exchange is needed among neighbor BSs to make sure the information is updated. As a consequence, high signalling load is generated.

Besides, at the present stage, there is no way that a BS can use to inform neighbor BSs which subchannels are reserved or preferred for transmission at the BS. Hence collisions to Co-Channel interference (CCI) and Adjacent Channel Interference (ACI) among neighbor BSs cannot be avoided. As a consequence, in a distributed RRM network profile, interference management among neighbor BSs cannot be operated in a proper way.

SUMMARY

One potential object of the invention is thus to provide a fully satisfactory response to the needs outlined in the foregoing, and particularly of avoiding Co-Channel Interference (CCI) among neighbor Base Stations.

The inventor proposes of a method for improving distributed resource allocation in OFDMA wireless communication networks.

The inventor also proposes a corresponding system, as well as a related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the system to be implemented in a distributed/modular fashion.

According to a preferred embodiment of the proposed method, the Base Station when exerts the role of NCMS sends a RRM Request message provided with a new trigger event to one or more neighbor Base Stations, in order to enable them to send back RRM Spare Capacity Report Response messages only in case at least a resource allocation parameter changes. The new trigger event can be configured on neighbor Base Stations only once, e.g. after cell setup, by sending C-RRM-REQ message. After trigger event configuration is set, neighbor Base Stations autonomously and indefinitely send C-RRM-RSP messages to the requesting Base Stations any time resource allocation changes, without the need of receiving further C-RRM-REQ messages from the sending Base Station.

Adopting the new mechanism, the C-RRM-RSP (Spare Capacity Report) response messages are only sent in case one of the following parameters already defined in IEEE P802.16g/D7, January 2007, changes at a target Base Station:
   N_PERMUTATION_ZONE,
   OFDMA symbol offset,
   Permutation scheme,
   Permutation Zone Subchannels Bitmap.

The triggered Spare Capacity Report also includes in the attribute list the "Permutation Zone Subchannels Bitmap" accounting for all Permutation Zones with the indication of radio resources that are of preferred use at the sending Base Station. This corresponds to a new usage of the C-RRM-RSP primitive. Operating as said, and asking the NCMS for aligning corresponding permutation zones in neighbor Base Stations, the requesting Base Station can decide in any time to avoid reusing same radio resources so as to prevent Co-Channel interference.

Profitably, with the method, the RRM Controller located in the Base Station maintains updated information concerning the allocation of Permutation Zones of its neighbor Base Stations, with limited amount of signalling load. As a consequence of the reduced signalling load, also processing load generated in the Base Station to analyze the received messages is reduced.

Furthermore, the RRM Controller located in the Base Station has a mean to inform RRM Controller of neighbor Base Stations about the Radio Resource allocation at the sending Base Station.

Thanks to the arrangement proposed, distributed RRM can be realized in a more effective way, e.g. avoiding reusing same Radio Resources in neighbor BSs.

As indicated, practical implementation of the arrangement described herein may involve certain modifications to the IEEE 802.16g/D7 specification in order to enable neighbor Base Stations to carry out the distributed RRM signalling in support of new event driven Spare Capacity Report.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

As indicated, a preferred field of application of the arrangement described herein are communication networks complying with the IEEE 802.16g standard or the WiMAX Forum specifications. The general layout and arrangement of such networks are well known to the person of skill in the related art, thus making it unnecessary to provide a detailed description herein. The following will thus primarily adopt terminology from the IEEE 802.16g standard, with the proviso that the same concepts will identically apply also to networks complying with the WiMAX Forum specifications (i.e. Stage 2 and Stage 3 specifications).

Figure 1:
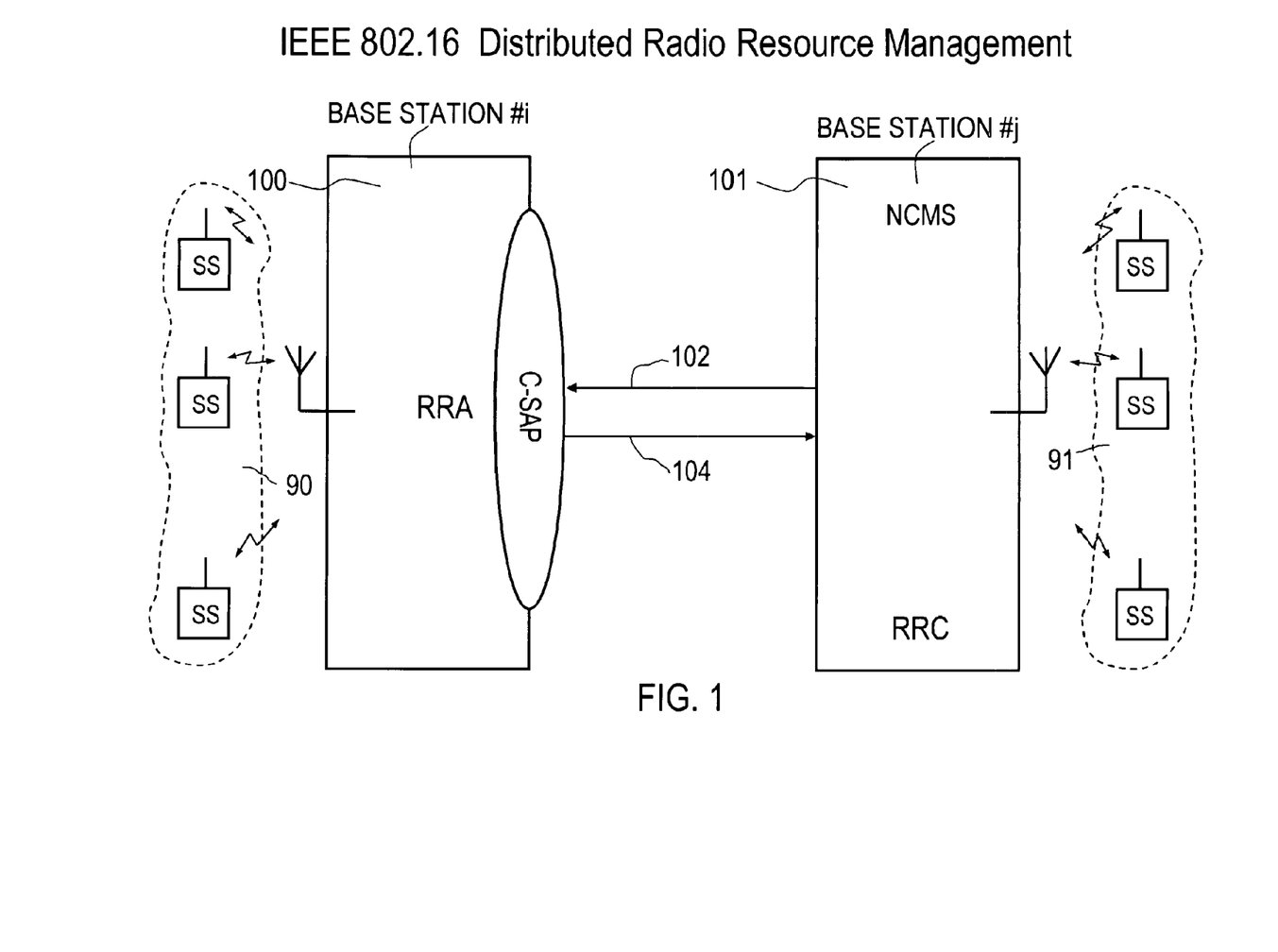
FIG. 1 shows a very general schematization of the distributed Radio Resource management (RRM) according to current IEEE 802.16 networks.

In FIG. 1, we see a wireless Communication System of the type IEEE 802.16e-2005 and IEEE 802.16g including a Base Station 100 connected to a neighbor Base Station 101 via transport connections either radio or terrestrial. Base Stations 100 and 101 have respective sets of radio links active with corresponding sets of served mobile Subscriber Stations indicated as 90 and 91. Two signalling messages 102 and 104, represented by arrows, are transmitted (not simultaneously) on the transport connections. Base Stations 100 and 101 include respective processors and memories for implementing all the features foreseen for the RRM manager and the NCMS manager.

The signalling diagram of FIG. 1 illustrates co-operation between Base Station 100 (#i in the left-hand side) and Base Station 101 (#j in the right-hand side) through RRM related signalling according to a distributed RRM of known art. In such a network the two Base Stations will be generally regarded as including a Radio Resource Agent (RRA) having associated a Core Service Access Point (C-SAP) interface and a Radio Resource Control (RRC), being the two roles interchangeable from the point of view of distributed RRM. The two Base Stations 100 and 101 will be also generally regarded as including a Network Control and Management System (NCMS). The most general scenario includes many neighbor Base Stations encompassing the two roles.

In the arrangement described herein, the NCMS included in the BS 101 is able to control the allocation of Permutation Zones and Radio Resources within the neighbor BS 100 (and within other neighbor BSs not shown in the figure).

Networks such as WiMAX support frequency reuse, i.e. all cells/sectors operate on the same frequency channel to maximize spectral efficiency. Users can operate on subchannels, which only occupy a small fraction of the whole channel bandwidth.

Flexible subchannel reuse is facilitated by subchannel segmentation and permutation zones. A segment is a subdivision of the available OFDMA subchannels (one segment may also include all subchannels). One segment is used for deploying a single instance of Medium Access Control (MAC) protocol.

A permutation zone is a plurality of contiguous OFDMA symbols in Downlink (DL) or Uplink (UL) that use the same permutation formula. The DL or UL sub-frame may contain more than one permutation zone.

The IEEE 802.16g/D7 specification offers a set of RRM (Radio Resource Management) primitives for radio resource measurements and reporting procedures between BS and NCMS.

With reference to FIG. 1, in general terms, the "dialogue" between BS entity 101, playing the role of RRC, and neighbor BS entity 100, playing the role of RRA, will be comprised of at least two RRM messages for spare capacity requesting and reporting, namely:

a request message 102, i.e. C-RRM-REQ (Spare Capacity Report) from the RRC 101 to the RRA 100;

a response message 104, i.e. C-RRM-RSP (Spare Capacity Report) from the RRA BS entity 100 to the RRC BS entity 101.

Implementing the arrangement described herein thus entails modifying these two messages to let the RRC BS entity become aware of the detailed radio resource spare capacity information in the neighbor BS entities, in order to avoid the CCI problem.

Specifically, with the message 102 the NCMS will send a C-RRM-REQ (Operation Type=Action, Action_Type=Spare Capacity Report) primitive to all the neighbor 802.16 BS Entities type 100. The current format of C-RRM-REQ message 102 is as follows:

---
C-RRM-REQ
---
(
    Message_id,
    Operation_Type(Action),
    Action_Type(Spare Capacity Report),
    Object_id(BS_ID or NCMS node),
    Attribute_List:
        Spare Capacity Report Type,
        Report Characteristics,
)

---

At present stage, Spare Capacity Report Type=1 is used. Report Characteristics indicates whether the report should be sent periodically, or be event driven. Following events are possible (separate or in combination):

Completion of Network Entry,
Deregistration of MS,
Adding/changing/deleting connections,
MOB_MSHO-REQ received from MS,
MOB_SCAN-REPORT received from MS,
Association performed by MS,
MOB_HO-IND received by Serving BS,
Completion of network re-entry at Target BS after HO,
Report solicitation from RRC,
Reporting per permutation zones.

Furthermore, in the current specification version, the primitive 104:
C-RRM-RSP (Operation Type=Action, Action_Type=Spare Capacity Report) is used by all neighbor 802.16 BS Entities as 100 to provide spare capacity information in response to the primitive 102.

The current format of C-RRM-RSP is as follows:

---
C-RRM-RSP
---
(
    Message_id,
    Operation_Type(Action),
    Action_Type(Spare Capacity Report),
    Object_id(BS_ID or NCMS node),
    Attribute_List:
        Spare Capacity Report Type,
        N_PERMUTATION_ZONES,
        For all permutation zones:
            OFDMA symbol offset,
            Permutation scheme,
            Available Radio Resource,
            Radio Resource Fluctuation.
)
Spare Capacity Report Type
Type of report profile = 1

---

Where:

N_PERMUTATION_ZONES
Is the number of radio frame subsections for which the spare capacity will be indicated. A value of 1 indicates that the entire DL and UL radio subframe is considered to be a single permutation zone each, in which case the DL/UL Available Radio Resource indicators cover the full DL and UL radio subframes.

OFDMA Symbol Offset
Denotes the start of the zone (counting from the frame preamble and starting from 0)

Permutation Scheme
Denotes permutation scheme used in current permutation zone. The following types are possible:
DL PUSC (Partial Usage Subchannel) permutation,
DL FUSC (Full Usage Subchannel permutation,
DL Optional FUSC permutation,
DL AMC (Adaptive Modulation and Coding),
DL TUSC1 (Tile Usage Subchannel 1),
DL TUSC2,
UL PUSC,
UL AMC, Available Radio Resource
Percentage of reported average available subchannels and symbols resources ("slots") per frame. If N_PERMUTATION_ZONES>1, the indicator covers a permutation zone instead of the entire DL or UL radio subframe.

Radio Resource Fluctuation
Radio Resource Fluctuation is used to indicate the degree of fluctuation in DL and UL channel data traffic throughputs. If N_PERMUTATION_ZONES>1, the indicator covers a permutation zone instead of the radio frame. When Radio Resource Fluctuation is set to 0, it implies that the DL and UL data traffic is constant in data throughput. Hence, there is no fluctuation in Available Radio Resource. When Radio Resource Fluctuation is set to maximum value 255, the data traffic is very volatile in nature which makes the Available Radio Resource unpredictable. The Radio Resource Fluctuation for all traffic models should be in the range of 0 to 255.

If permutation zones of different 802.16 BS Entities of one or more neighbor BSs are aligned, and within each zone different subchannels are used, CCI and mobile-to-mobile and BS-to-BS interference can be completely eliminated.

Alignment features for centralized allocation of radio resources in the same 802.16 contest is disclosed in the European patent application No. 06425552.4 filed by the same Applicant in date 1 Aug. 2006. According to the cited document, permutation zones "alignment" is achieved (i.e. the permutation zones are aligned) when all the neighbor BS Entities are synchronized in time and frequency, which means that the starting time of each permutation zone is the same for all the BS Entities controlled by the aforementioned RRC entity within NCMS.

According to the arrangement described herein, with reference to figures beyond FIG. 1, when a set of subchannels used by a RRA BS Entity is changed, the NCMS will be aware of it, so as to prevent the neighbor RRC BS Entity to use the specified set of subchannels to avoid CCI; this implies alignment of the permutation zones among neighbor BSs.

Figure 3:
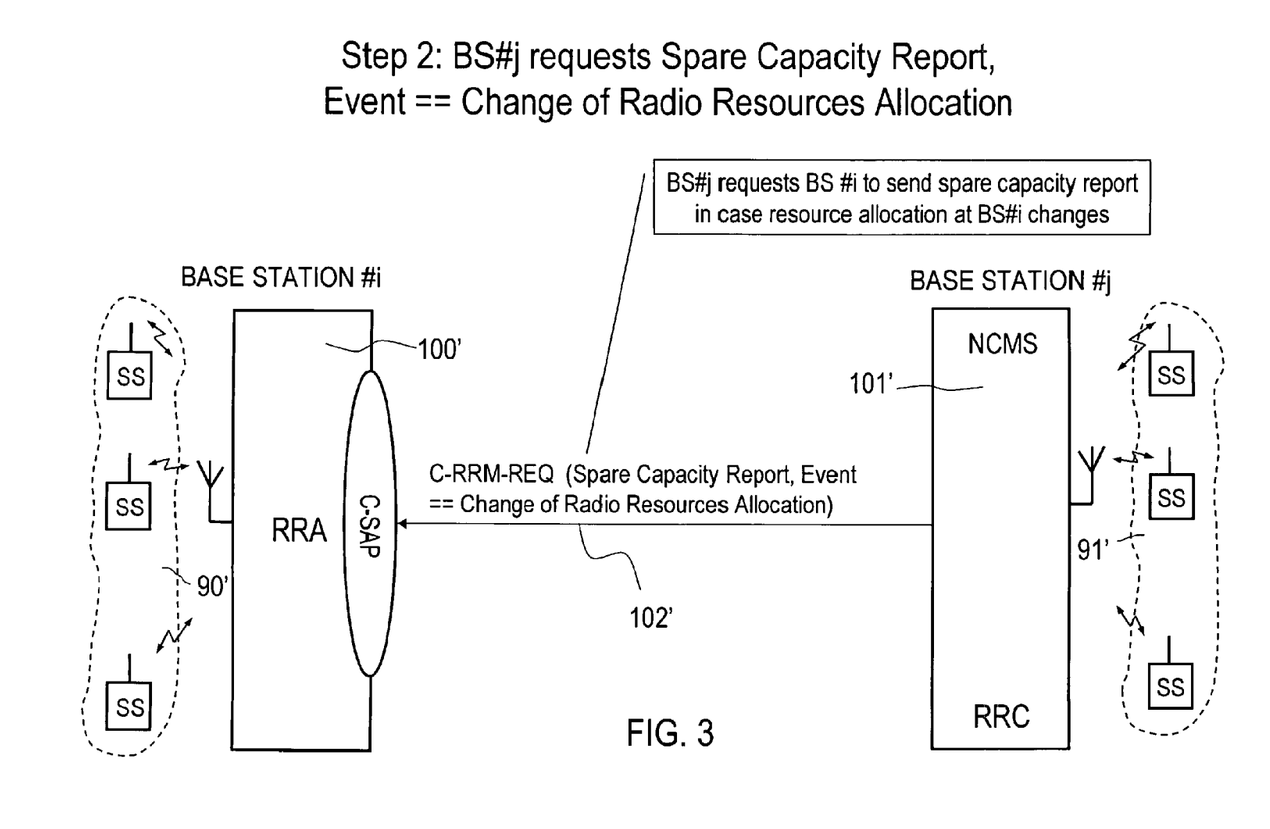
FIGS. 3 to 6 show the evolution of the initial diagram of FIG. 2 under the action of primitive flow according to the context of the proposed system.

In FIG. 3 (the SSs are indicated with 90' and 91') a RRC BS Entity 101' sends a modified request message 102' including a modified primitive:
C-RRM-REQ (Operation Type=Action, Action_Type=Spare Capacity Report) in which:
Report Characteristics indicate "event driven".

A new attribute called:
    Change of Radio Resource Allocation,
is added to the Report Characteristics (italics font indicates modification with respect to the present version of the standard).

As already said in the introduction, the new trigger event can be configured on neighbor BSs only once, e.g. after cell setup, by sending C-RRM-REQ message.

Once the neighbor target BS Entity 100' receives the request message 102' it shall check when any of the following operation parameters changes:
    N_PERMUTATION_ZONES,
    OFDMA symbol offset,
    Permutation Scheme,
    Permutation Zone Subchannels Bitmap.

Figure 5:
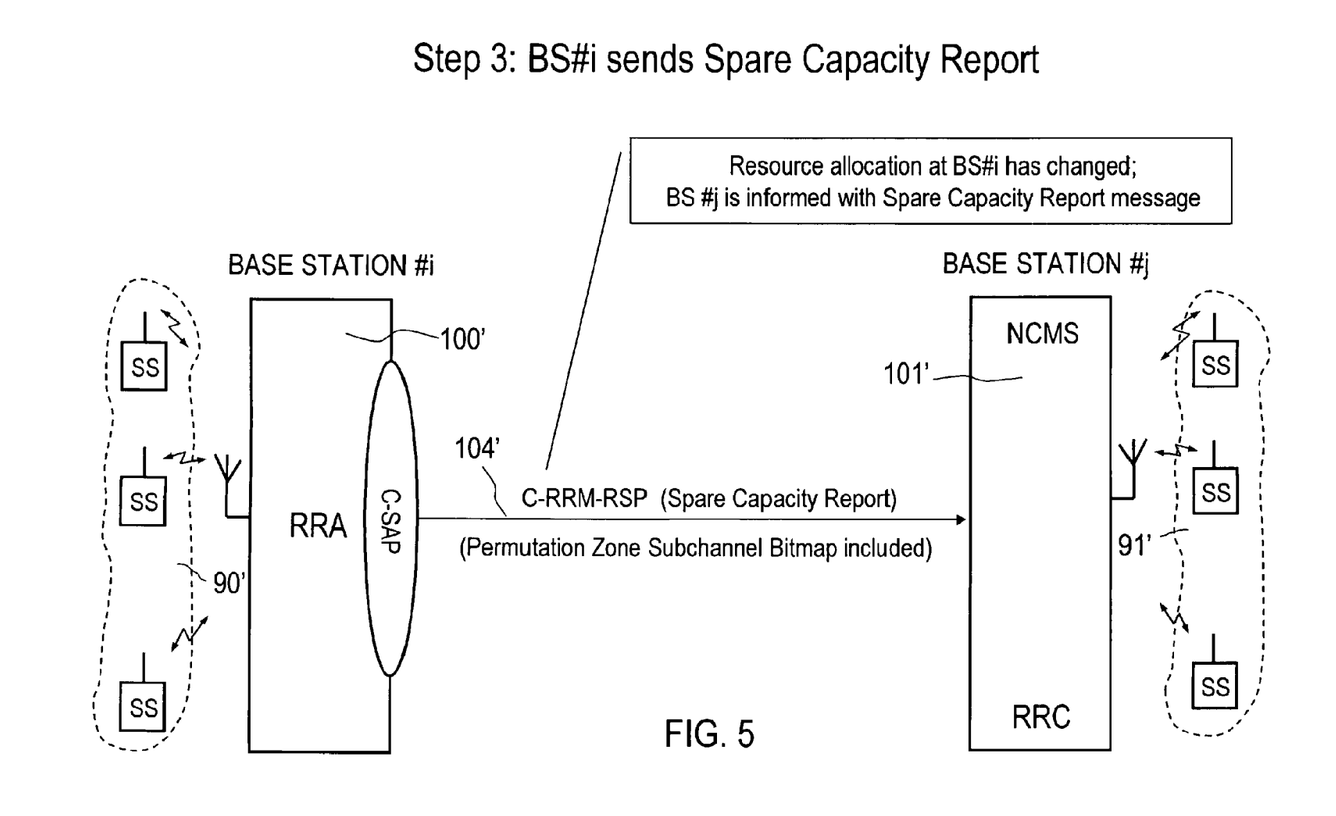

According to the arrangement described In FIG. 5 (the SSs are indicated with 90' and 91'), every time that at least one of these parameters changes during normal operation, the target BS 100' sends a response message 104' to the requesting BS 101' including a modified primitive:
    C-RRM-RSP (Operation Type=Action, Action_Type=Spare Capacity Report) to provide spare capacity information to RRC at BS 101'. In the Attribute List of this primitive the N_PERMUTATION_ZONE IE also includes: "Permutation Zone Subchannels Bitmap" for indicating all the preferred subchannels used for transmission in this Permutation Zone by the Base Station 100'. This corresponds to a new usage of the C-RRM-RSP primitive.

As already said in the introduction, after trigger event configuration, neighbor BSs autonomously send C-RRM-RSP messages any time resource allocation changes, without the need of receiving further C-RRM-REQ messages from the sending Base Station.

The reporting method based on the modified messages and primitives is illustrated graphically in FIGS. 2 to 6 of annexed drawings referable to communication networks based on the OFDMA physical layers compliant with IEEE P802.16g.

Figure 2:
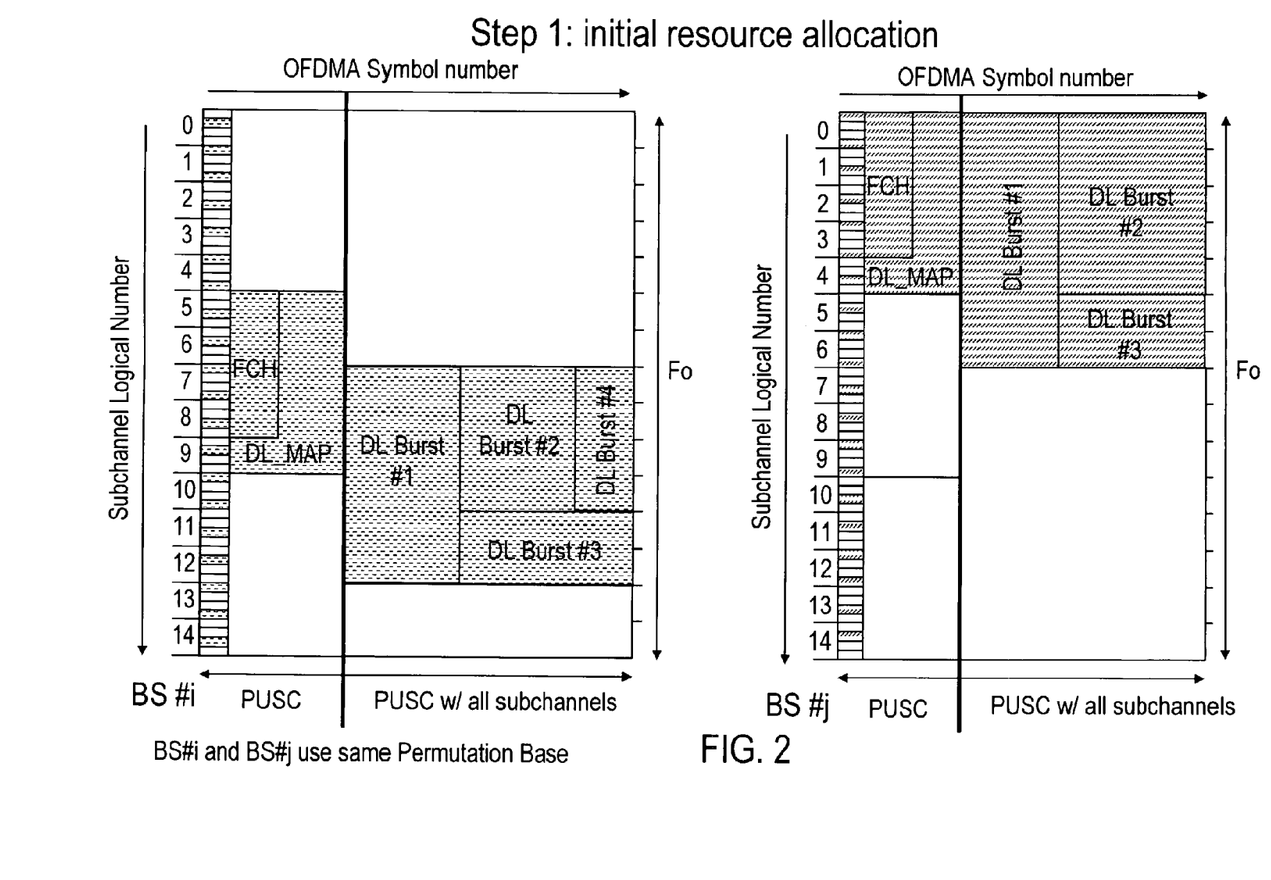
FIG. 2 shows an initial diagram representative of frame allocation of subchannels and OFDMA symbols used by two Base Stations #i and #j involved in the distributed RRM of FIG. 1.

STEP 1—With reference to FIG. 2, the exemplary initial allocation of resources in DL frames is shown for both BS #i 100' (FIG. 3 left-hand side) and BS #j 101' (FIG. 3 right-hand side). BS 100' and BS 101' are sharing the same frequency band around frequency Fo, as illustrated in FIG. 2 and the successive figures; this allows reuse factor. Canonical representation of a TDD subframe is adopted for encompassing Subchannels versus OFDMA symbols. Resources of the BS are located into two adjacent DL permutation zones separated by a thick line. Each DL permutation zone adopts different permutation schemes (i.e. permutation formula). The first DL zone starts with the PUSC permutation scheme used to transmit FCH (Frame Control Header) and DL-MAP information. The subsequent DL zone includes "PUSC with all subchannels" permutation scheme, used to transmit four groups of subchannels (segments) relevant to four DL Bursts #1 to #4 of payload. In order to avoid cochannel interference (CCI), it can be noticed that different subchannels are allocated to the two BS Entities 100' and 101'.

STEP 2)—With reference to FIG. 3, firstly, the RRC BS entity 101' sends the unique request message 102' described before to the C-SAP included in the RRA BS entity 100'. As already said, the Message 102' includes the new attribute "Change of Radio Resource Allocation" among those events foreseen to trigger the Spare Capacity Report at the target BS 101'.

Figure 4:
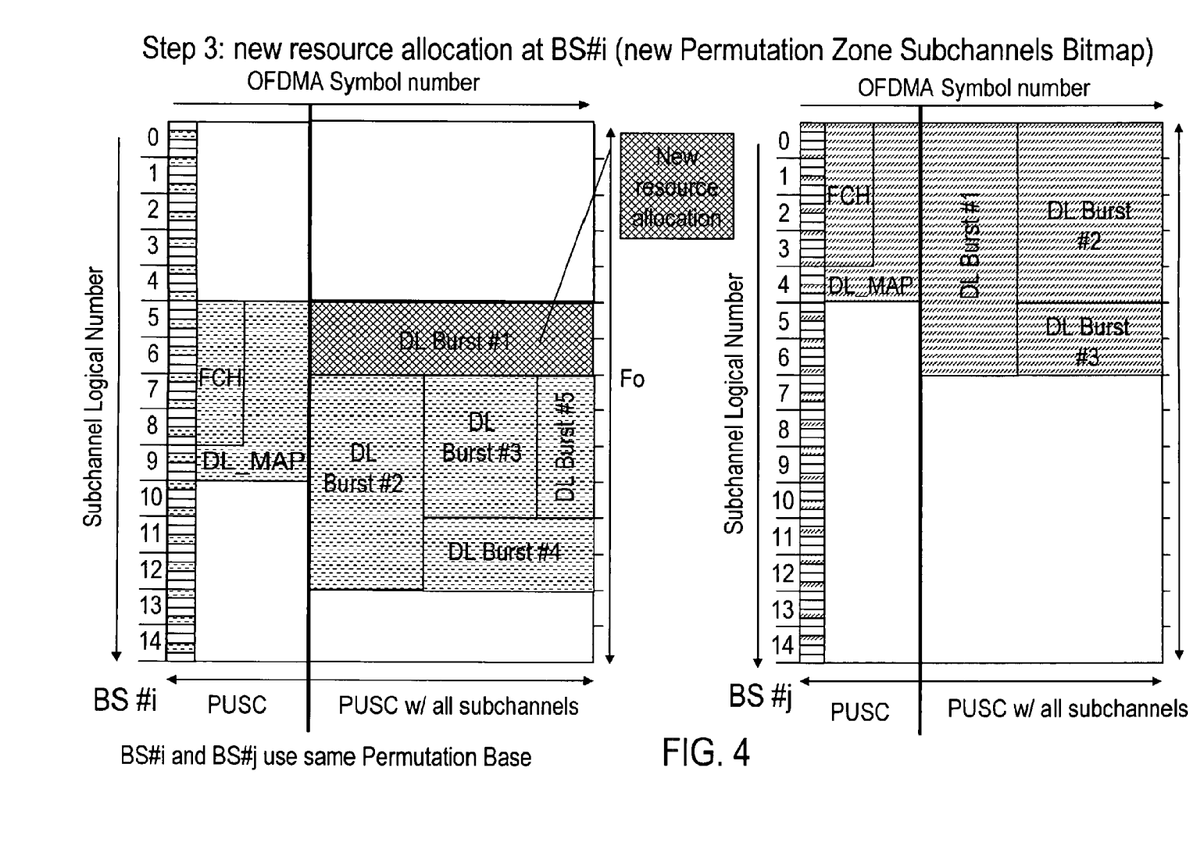

STEP 3)—With reference to FIG. 4, because of traffic load is increased at the BS Entity 100', for instance when a higher number of connections has to be served, the bandwidth allocated to the RRA BS Entity 100' (as number of allocated subchannels) is increased consequently, this is possible employing a different permutation scheme. In the specific, a new group of subchannels for DL Burst #1 is added on the top of the fours existing groups in the "PUSC with all subchannels" DL permutation zone. With reference to FIG. 5, since the event "Change of Radio Resource Allocation" is fulfilled at the BS entity 100', it starts up to prepare its response message C-RRM-RSP (Spare Capacity Report) 104' that will be sent to the RRC BS 101'. The Spare Capacity Report includes the attribute "Permutation Zone Subchannel Bitmap" that indicates all deployed subchannels at the BS#i and relevant OFDMA symbols for the two permutation zones. With reference to FIG. 4, the bitmap managed by BS#i includes the index-offset of the following subchannels: FCH, DL_MAP, DL Burst#1, DL Burst#2, DL Burst#3, DL Burst#4, and DL Burst#5.

Figure 6:
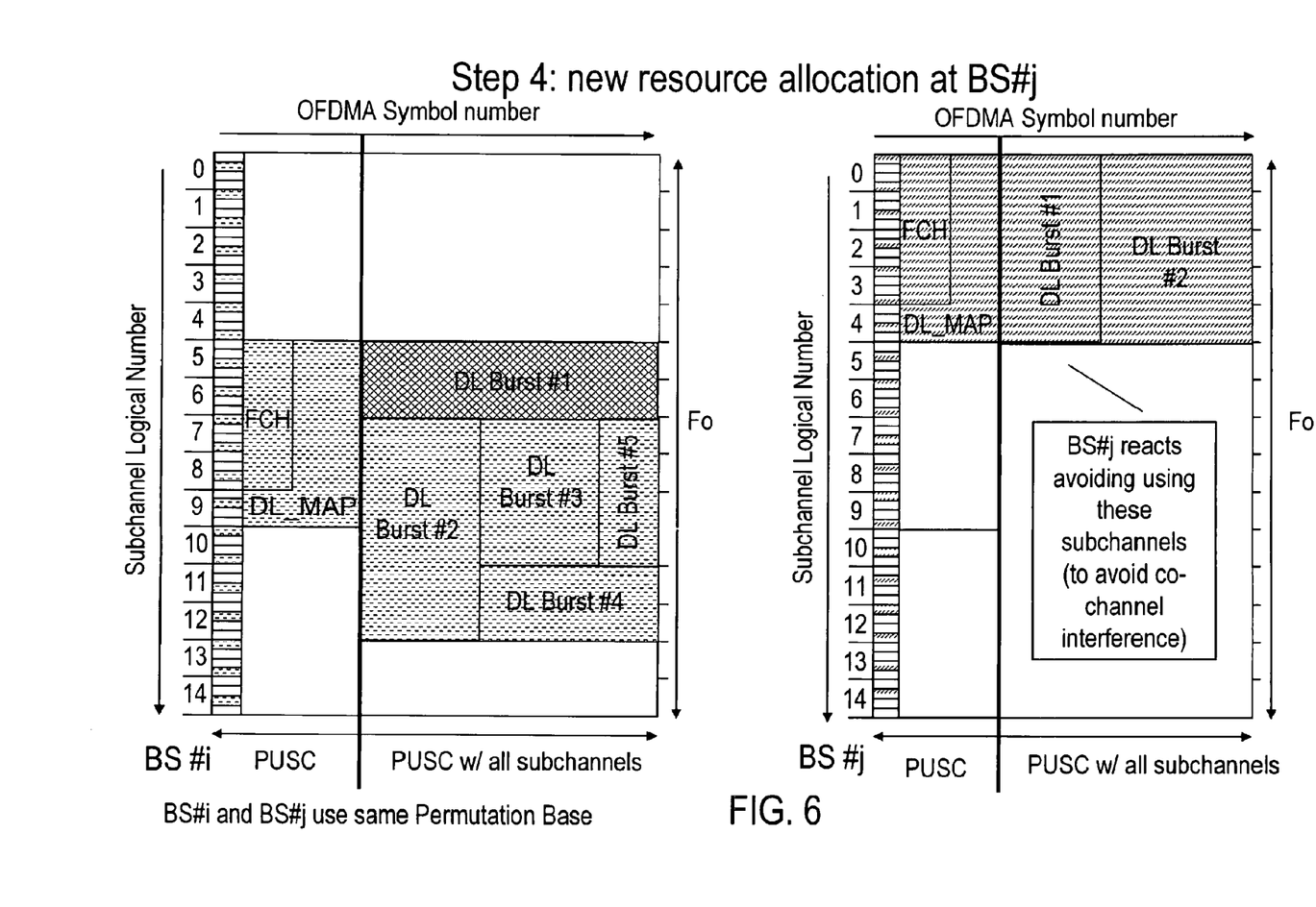

STEP 4)—With reference to FIG. 6, when the RRC BS#j 101' receives the response message C-RRM-RSP (Spare Capacity Report) 104', it reads the Permutation Zone Subchannel Bitmap and becomes aware of all subchannels inside the two permutation zone (PUSC) allocated to the RRA BS#i 100'. The RRC BS#j entity, aimed to reduce the Cochannel interference at its site, reacts avoiding of using those subchannels having the same index-offset as the DL Burst#1.

The arrangement described herein makes it possible to design a distributed RRM algorithm that bases its decision on assigning radio resources on cell traffic load, conditioned by a low level of tolerated interference.

The modified C-RRM-REQ and C-RRM-RSP messages introduced by the arrangement described herein enable a RRC BS Entity 101' to become aware of every change in the subchannels allocated to the neighbor BS Entities 100' for each permutation zone. A twofold advantage is obtained by the network: firstly, the signaling throughput is drastically reduced and, secondly, the BS Entity 101' exerts a preventive action against potential interferences.

Those skilled in the art will promptly appreciate that in the arrangement described herein every BS entity can assume the RRC or RRA role, indifferently, being the roles interchangeable in flexible BS to BS communications. Those skilled in the art will also appreciate that all arrangements described for Downlink permutation zones and Downlink subchannels, are also applicable to Uplink permutation zones and Uplink subchannels.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of improving distributed resource allocation in a wireless communication network based on Orthogonal Frequency Division Multiple Access (OFDMA) including at least two neighbor base stations serving subscriber stations, the method comprising:
    controlling an allocation of respective permutation zones and radio resources encompassing different radio subchannels within each of the permutation zones at each of the base stations, the controlling of the allocation including detecting changes of the radio resources allocated to each of the base stations to trigger, at any change detection, transmission of a report by a Radio Resource Agent of the Base Station to at least a Radio Resource Control of a neighbor Base Station, the report including a bitmap indicating subchannels used for transmission in each permutation zone to at least one neighbor base station, wherein each of the base stations encompasses role of the Radio Resource Agent and of the Radio Resource Control.

2. The method of claim 1, wherein the report is a spare capacity report.

3. The method of claim 1, wherein a change of radio resources allocation further includes changing any of the following parameters: $N_{13}$ PERMUTATION$_{13}$ ZONE, OFDMA Symbol offset, Permutation Scheme, and Permutation Zone Subchannels Bitmap.

4. The method of claim 1, wherein the transmission of the report is requested by the at least one neighbor base station only once.

5. The method of claim 4, wherein the report further includes values of the following attributes: $N_{13}$ PERMUTATION$_{13}$ ZONE, OFDMA Symbol offset, Permutation Scheme, Available Radio Resource, and Radio Resource Fluctuation.

6. The method of claim 1, wherein the controlling the allocation of permutation zones and radio resources uses primitives of Radio Resource Management (RRM) supported by a network control and management system.

7. The method of claim 6, wherein the RRM primitives are invoked to align corresponding permutation zones in the neighbor base stations.

8. The method of claim 7, wherein at least one of the neighbor base stations avoids reusing same subchannels already indicated in the included bitmaps upon reception of the report, thereby preventing co-channel interference.

9. A wireless communication system based on Orthogonal Frequency Division Multiple Access (OFDMA) comprising:
a plurality of subscriber stations; and
at least two neighbor base stations serving the subscriber stations, each base station including a processor controlling an allocation to the base station of respective permutation zones and radio resources encompassing different radio subchannels within each of the permutation zones by detecting changes of radio resources allocated to the base station to trigger, at any change detection, transmission of a report by a Radio Resource Agent of the Base Station to at least a Radio Resource Control of a neighbor Base Station, the report including a bitmap indicating subchannels used for transmission in each permutation zone to at least one neighbor base station, wherein each of the base stations encompasses role of the Radio Resource Agent and of the Radio Resource Control.

10. The system of claim 9, wherein the report is a spare capacity report.

11. The system of claim 9, wherein the processor executes primitives of Radio Resource Management (RRM) supported by a Network Control and Management System.

12. The system of claim 11, wherein the RRM primitives include aligning corresponding permutation zones in the neighbor base stations.

13. The system of claim 12, wherein the RRM primitives include not reusing same subchannels already indicated in the received bitmap.

14. A non-transitory computer readable storage medium storing a program to control a computer to perform a method of improving distributed resource allocation in a wireless communication network based on Orthogonal Frequency Division Multiple Access (OFDMA) including at least two neighbor base stations serving subscriber stations, each of the base stations encompassing role of the Radio Resource Agent and of the Radio Resource Control, the method comprising:
controlling an allocation of respective permutation zones and radio resources encompassing different radio subchannels within each of the permutation zones at each of the base stations, the controlling the allocation including detecting changes of the radio resources allocated to each of the base stations to trigger, at any change detection, transmission of a report by a Radio Resource Agent of the Base Station to at least a Radio Resource Control of a neighbor Base Station, the report including a bitmap indicating subchannels used for transmission in each permutation zone to at least one neighbor base station.

* * * * *

UNITED STATES PATENT AND TRADEMARK OFFICE
CERTIFICATE OF CORRECTION

PATENT NO. : 8,305,975 B2  
APPLICATION NO. : 12/450035  
DATED : November 6, 2012  
INVENTOR(S) : Daniele Tortora Page 1 of 1

It is certified that error appears in the above-identified patent and that said Letters Patent is hereby corrected as shown below:

Column 9, Line 10, In Claim 3, delete "$N_{13}$ PERMUTATION$_{13}$ ZONE," and insert -- N_PERMUTATION_ZONE, --, therefor.

Column 9, Line 17-18, In Claim 5, delete "$N_{13}$ PERMUTATION$_{13}$ ZONE," and insert -- N_PERMUTATION_ZONE, --, therefor.

Signed and Sealed this  
Twenty-second Day of January, 2013

David J. Kappos  
*Director of the United States Patent and Trademark Office*